United States Patent [19]
Tarpill

[11] Patent Number: 5,305,529
[45] Date of Patent: Apr. 26, 1994

[54] ADAPTER FOR CIRCULAR-TYPE SAW

[75] Inventor: Andrew J. Tarpill, East Haddam, Conn.

[73] Assignee: Capewell Components Company, Cromwell, Conn.

[21] Appl. No.: 39,894

[22] Filed: Mar. 30, 1993

[51] Int. Cl.$^5$ .............................................. B23D 47/02
[52] U.S. Cl. ........................................ 30/374; 30/371; 30/373
[58] Field of Search ............... 30/371, 372, 373, 374, 30/375, 376, 377, 378; 83/743, 745

[56] References Cited

U.S. PATENT DOCUMENTS

| | | | |
|---|---|---|---|
| 245,816 | 8/1881 | Grill . | |
| 264,412 | 9/1882 | Kuhlmann . | |
| 278,130 | 5/1883 | Groff . | |
| 1,975,191 | 10/1934 | Calef | 30/371 |
| 2,674,027 | 4/1954 | Kosniski | 30/373 |
| 2,823,711 | 2/1958 | Kaley | 143/159 |
| 2,973,576 | 3/1961 | Hentke | 30/371 |
| 3,808,932 | 5/1974 | Russell | 83/478 |
| 3,834,436 | 9/1974 | Burkett | 144/326 |
| 4,112,987 | 9/1978 | Pachnik | 30/373 |
| 4,267,636 | 5/1981 | Ducret | 30/90.3 |
| 4,270,270 | 6/1981 | Loyd | 30/122 |
| 5,084,977 | 2/1992 | Perkins | 30/371 |

*Primary Examiner*—Richard K. Seidel
*Assistant Examiner*—Paul M. Heyrana, Sr.
*Attorney, Agent, or Firm*—DeLio & Peterson

[57] ABSTRACT

An adapter for use with a circular-type saw for controllably making incisions in a tubular member comprising a base having an elongated slot therein, means for attaching the base to the saw in such a manner that the slot receives a portion of the blade of the saw, and means for removably mounting the saw upon the tubular member in the area of the intended incision. The base has a top and bottom surface and is attached to the saw in such a manner that the top surface of the base faces the saw. The mounting means is attached to and projects from the bottom surface of base. The mounting means has first and second perpendicularly intersecting, substantially V-shaped channels. The second V-shaped channel substantially overlaps the slot. The portion of the saw blade received by the slot is operative within the slot and the second V-shaped channel.

2 Claims, 4 Drawing Sheets

ADAPTER FOR CIRCULAR-TYPE SAW

BACKGROUND OF THE INVENTION

1. Field of the Invention

The present invention relates to an adapter for use with circular-type saws and, in particular, to an adapter that allows axial or radial incisions to be made in any metallic or non-metallic material that is utilized to cover power, control or communication cables.

2. Description of Related Art

When working with power, control or communication cables, it is frequently necessary for utility workmen or technicians to gain access to conducting wires within the protective outer shell or jacket of the cable without actually severing the cable. Such situations arise when it is desired to perform fault isolation of cable networks, insert additional conducting wires in the cable, or perform modifications to existing cable networks, such as the installation of monitoring equipment, meters, etc. Typically, the cable shell or jacket is non-metallic, such as polystyrene or plastic. Metal cable shells or jackets, however, are also utilized, especially in industrial settings. Some cable shells or jackets have outer surfaces comprised of circular or spiral corrugations.

Electrical circular-type saws are typically utilized to make the required axial (longitudinal) or radial (circumferential) incisions or slits in the cable shell or jacket. It has been found, however, that it is difficult to keep the circular-type saw correctly positioned on the outer surface of the cable or jacket while making the axial or radial incisions. Such difficulty has resulted in: (1) unnecessary damage to the outer surface of the cable shell or jacket, (2) jagged edges bordering the incision, (3) incisions of the wrong dimensions, and (4) damage to the inner conducting wires.

Bearing in mind the problems and deficiencies of the prior art, it is therefore an object of the present invention to provide a new and improved adapter for use with circular-type saws that will allow the user to easily keep the saw positioned on the cable shell or jacket at the desired location.

It is another object of the present invention to provide a new and improved adapter for use with circular-type saws that provide for saw-blade depth adjustment, thereby allowing the user of the saw to make incisions of varying depth within the material comprising the cable shell or jacket.

It is another object of the present invention to provide a new and improved adapter for use with circular-type saws that can be readily removed to allow the user of the saw to cut flat stock.

It is a further object of the present invention to provide a new and improved adapter for use with circular-type saws that provides for a precise and controlled cutting operation in both an axial (longitudinal) and radial (circumferential) direction.

It is another object of the present invention to provide a new and improved adapter for use with circular-type saws that provides a smooth and continuous motion of the saw as it moves across the surface of cables having circular or spiral corrugations.

It is another object of the present invention to provide a new and improved adapter that can be adapted to portable circular-type saws.

It is yet another object of the present invention to provide a new an improved adapter for use with circular-type saws that is of very simple construction and manufacturable at a reasonable cost.

SUMMARY OF THE INVENTION

The above and other objects, which will be apparent to those skilled in the art, are achieved in the present invention which is directed to an adapter for use with a circular-type saw for controllably making incisions in a tubular member. The adapter comprises a base having an elongated slot therein, means for attaching the base to the saw in such a manner that the slot receives a portion of the blade of the saw, and means for removably mounting the saw upon the tubular member in the area of the intended incision. The base has a top and bottom surface and is attached to the saw in such a manner that the top surface of the base faces the saw. The mounting means is attached to and projects from the bottom surface of the base. The mounting means has first and second perpendicularly intersecting, substantially V-shaped channels. The second V-shaped channel substantially overlaps the elongated slot. The portion of the saw blade that is received by the slot is operative within the slot and the second V-shaped channel.

BRIEF DESCRIPTION OF THE DRAWINGS

For a fuller understanding of the invention, reference should be made to the following description taken in connection with the accompanying drawings, in which.

DESCRIPTION OF THE PREFERRED EMBODIMENT

Figure 1:
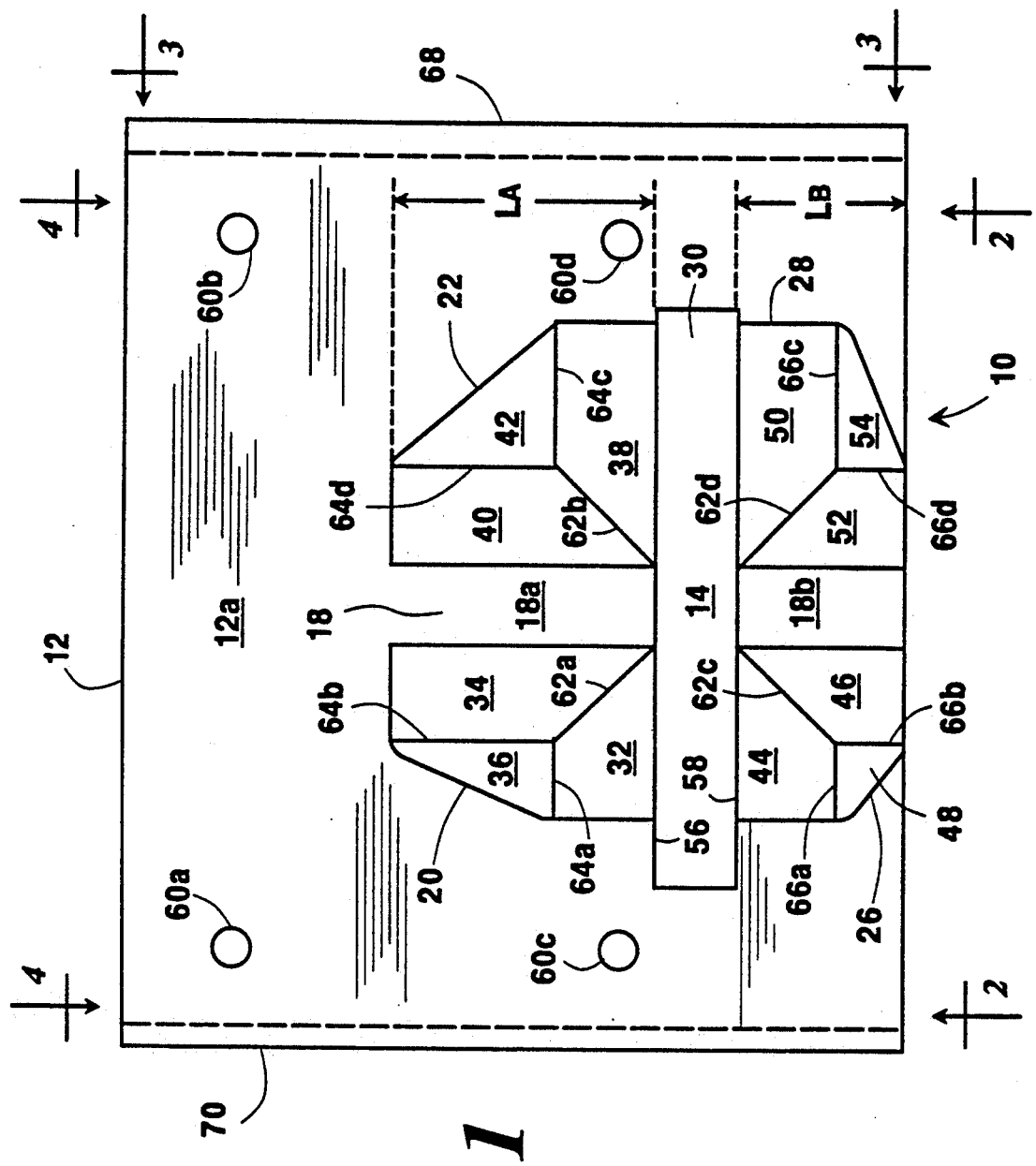
FIG. 1 is a top plan view of the adapter of the present invention.

In describing the preferred embodiment of the present invention, reference will be made herein to FIGS. 1-7 of the drawings in which like numerals refer to like features of the invention. Features of the invention are not necessarily drawn to scale in the drawings.

As shown in FIGS. 1, 2, 3 and 4, adapter 10 comprises base 12 and corner portions 20, 22, 26 and 28. Base 12 has elongated slot 14 therein which is substantially rectangular shaped and has lengthwise edges 56 and 58. Corner portions 20, 22, 26 and 28 project from and are rigidly connected to bottom surface 12a of base 12. Corner portions 20 and 22 are adjacent to and located at opposite ends of lengthwise edge 56 of slot 14. Similarly, corner portions 26 and 28 are adjacent to and located at opposite ends of lengthwise edge 58 of slot 14. Slot 14 is offset from the center of base 12. In a preferred embodiment, base 12 and corner portions 20, 22, 26 and 28 are fabricated from metal, for strength and durability. Corner portions 20, 22, 26 and 28 are brazed or welded to base 12.

Corner portion 20 is comprised of wall segments 32, 34 and top segment 36. Wall segment 32 is parallel and contiguous to lengthwise edge 56 of slot 14, and is contiguous to wall segment 34. Joint 62a is formed by the contact between wall segments 32, 34 and has a smooth and continuous surface. Top segment 36 is parallel to base 12 and is contiguous to wall segments 32 and 34. Joints 64a and 64b are formed by the contact between top segment 36 with wall segments 32 and 34, respectively, and have smooth and continuous surfaces.

Corner portion 22 is comprised of wall segments 38, 40 and top segment 42. Wall segment 38 is parallel and contiguous to lengthwise edge 56 of slot 14, and is contiguous to wall segment 40. Joint 62b is formed by the contact between wall segments 38, 40 and has a smooth and continuous surface. Top segment 42 is parallel to base 12 and is contiguous to wall segments 38 and 40. Joints 64c, 64d are formed by the contact between top segment 42 and wall segments 38, 40, respectively, and have smooth and continuous surfaces.

Channel segment 18a is intermediate corner portions 20 and 22 and is bounded by opposing wall segments 34 and 40 of corner portions 20 and 22, respectively. Wall segments 34 and 40 are angulated, with respect to base 12, in opposite directions thereby forming the V-shape of channel segment 18a.

Corner portion 26 is comprised of wall segments 44, 46 and top segment 48. Wall segment 44 is parallel and contiguous to lengthwise edge 58 of slot 14, and is contiguous to wall segment 46. Joint 62c is formed by the contact between wall segments 44, 46 and has a smooth and continuous surface. Top segment 48 is parallel to base 12 and is contiguous to wall segments 44 and 46. Joints 66a and 66b are formed by the contact between top segment 48 and wall segments 44 and 46, respectively, and have smooth and continuous surfaces.

Corner portion 28 is comprised of wall segments 50, 52 and top segment 54. Wall segment 50 is parallel and contiguous to lengthwise edge 58 of slot 14, and is contiguous to wall segment 52. Joint 62d is formed by the contact between wall segments 50, 52 and has a smooth and continuous surface. Top segment 54 is parallel to base 12 and is contiguous to wall segments 50 and 52. Joints 66c, 66d are formed by the contact between top segment 54 and wall segments 50, 52, respectively, and have smooth and continuous surfaces.

Channel segment 18b is intermediate corner portions 26 and 28 and is bounded by opposing wall segments 46 and 52 of corner portions 26 and 28, respectively. Wall segments 46 and 52 are angulated, with respect to base 12, in opposite directions thereby forming the V-shape of channel segment 18b. Channel segments 18a and 18b are coaxial with one another and define substantially V-shaped channel 18.

Wall segments 32 and 38, of corner portions 20 and 22, respectively, are angulated, with respect to base 12, in a direction opposite slot 14. Similarly, wall segments 44 and 50, of corner portions 24 and 28, respectively, are angulated, with respect to base 12, in a direction opposite slot 14. Angulated wall segments 32 and 38, of corner portions 20 and 22, respectively, and angulated wall segments 44 and 50, of corner portions 26 and 28, respectively, define substantially V-shaped channel 30. Channel 30 substantially overlaps slot 14 and perpendicularly intersects channel 18.

Referring to FIG. 1, since elongated slot 14 is offset from the center of base 12, the length LA, of wall segments 34 and 40, is greater than the length LB, of wall segments 44 and 50.

Figure 5:
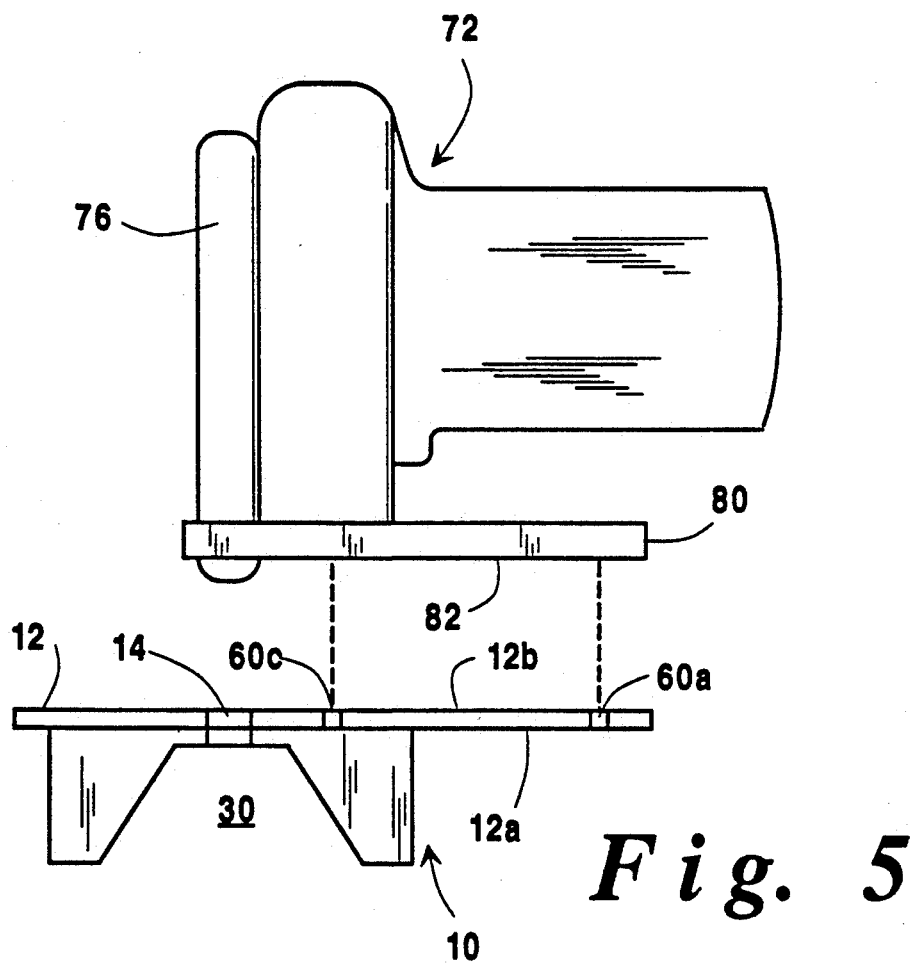
FIG. 5 is a front elevational exploded view of a circular-type saw utilizing the adapter of the present invention.

Referring to FIGS. 1 and 5, adapter 10 is attached to bottom surface 82 of base plate 80 of saw 72 in such a manner that top surface 12b of base 12 contacts bottom surface 82 of base plate 80. Through-holes 60a–d of base 12 (see FIG. 1) receive corresponding support screws (not shown). The support screws are screwed into corresponding threaded screw-inlets (not shown) in base plate 80 thereby securing adapter 10 to saw 72. Elongated slot 14 is offset from the center of base 12 and receives blade 74 and blade guard 76 of saw 72. Blade 74 and blade guard 76, which is typically spring activated, are completely operative within slot 14 and substantially V-shaped channel 30.

Figure 6:
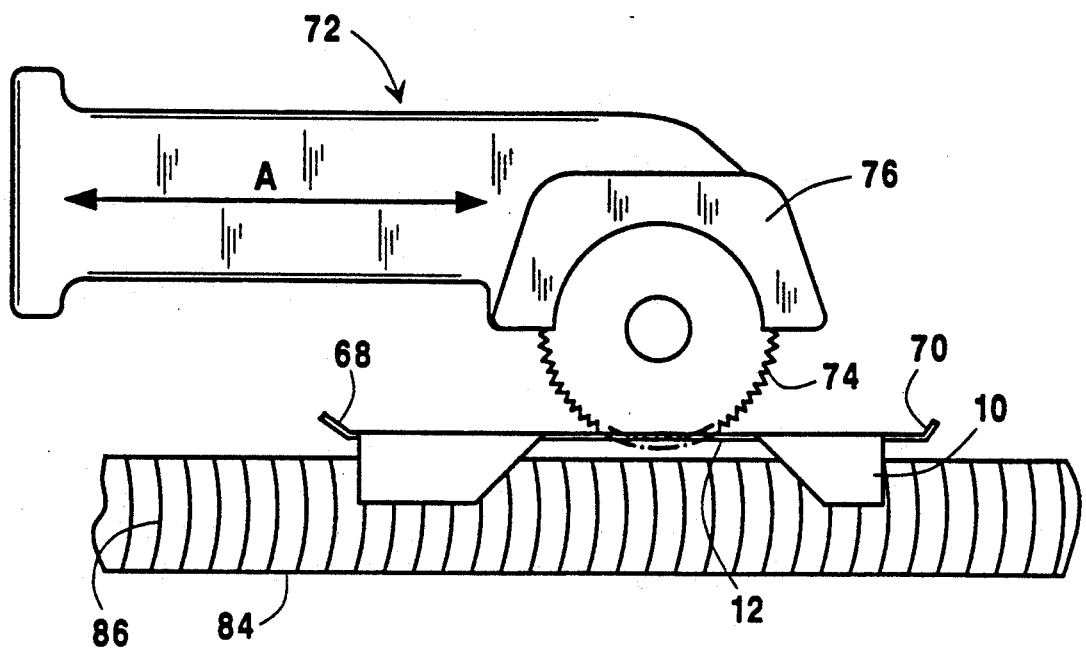
FIG. 6 is a side elevational view of a circular-type saw utilizing the adapter of the present invention to make a longitudinal incision in a tubular member.
Figure 7:
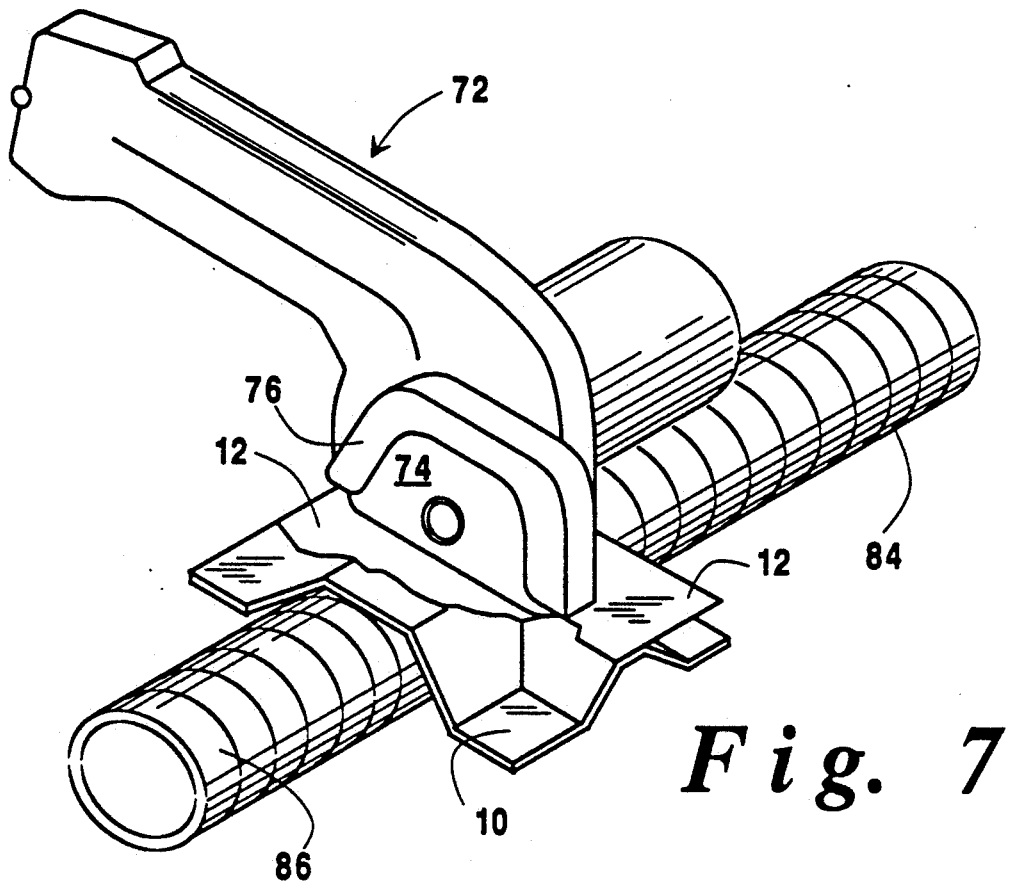
FIG. 7 is a perspective view of the circular-type saw utilizing the adapter of the present invention to make a circumferential incision in a tubular member.

FIG. 6 shows saw 72, with adapter 10 secured thereto, mounted upon cable 84 for making a longitudinal (axial) incision. Prior to mounting saw 72 upon cable 84, the user of the saw adjusts the depth of cut by an adjustment mechanism (not shown) on saw 72. The user of saw 72 then mounts the saw upon cable 84 in such a manner that the portion of cable 84 having the area of the intended incision is longitudinally disposed within V-shaped channel 30. FIG. 7 shows saw 72, with adapter 10 secured thereto, mounted upon cable 84 for making a circumferential (radial) incision. The user of the saw mounts the saw upon cable 84 in such a manner that the portion of cable 84 having the area of the intended incision is longitudinally disposed within substantially V-shaped channel 18.

Ends 68 and 70 of base 12, which are perpendicular to the axis of saw 72 (designated by the letter A in FIG. 6) are angulated toward saw 72 in order to prevent base 12 from becoming lodged in corrugations 86 of cable 84. Angulated ends 68, 70 and smooth surfaced joints 62a–d, 64a–d and 66a–d, facilitate a smooth and continuous motion of saw 72 along any rough and discontinuous surfaces of cable shells or jackets.

Figure 2:
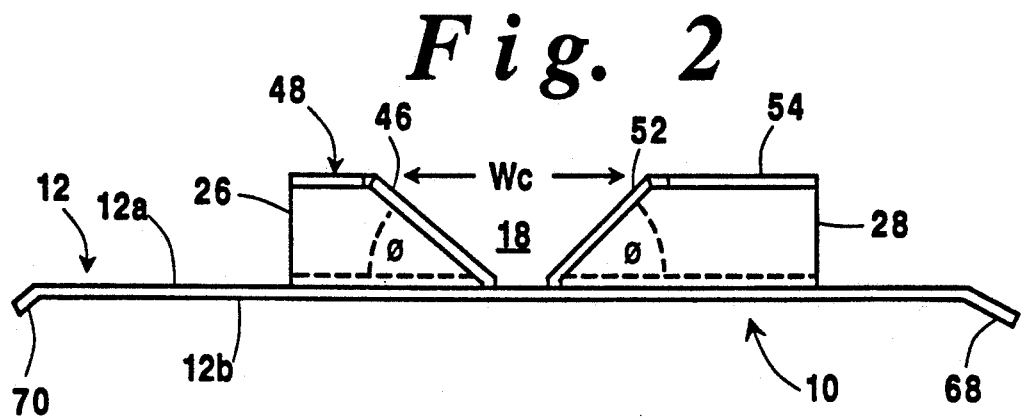
FIG. 2 is a side elevational view of the adapter taken along line 2—2 of FIG. 1.
Figure 3:
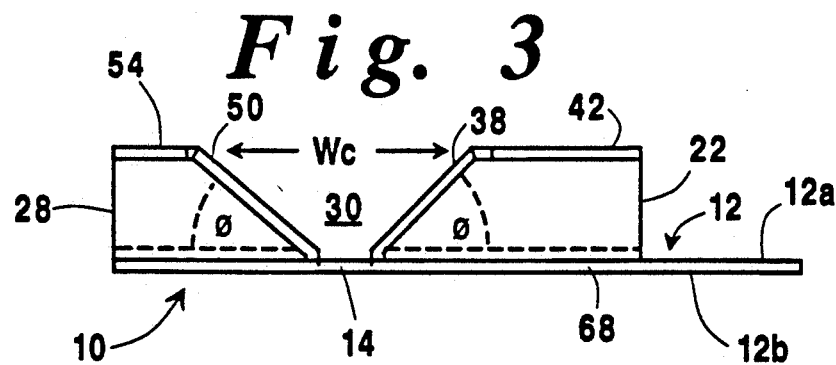
FIG. 3 is a side elevational view of the adapter taken along line 3—3 of FIG. 1.

Referring to FIGS. 2 and 3, channels 18 and 30 have a predetermined channel width $W_c$, thereby enabling each channel to receive portions of tubular members i.e. cables, circular ducts, conduits, etc. having a predetermined range of circumferences. During the manufacturing process of adapter 10, the width $W_c$ of the channels can be altered by increasing or decreasing the degree of angulation (designated by the symbol $\phi$ in FIGS. 2 and 3) of the first and second wall segments of each of the corner portions. In a preferred embodiment, the degree of angulation $\phi$ is approximately forty five (45) degrees. However, $\phi$ can be varied within the range of approximately thirty five (35) degrees and approximately forty five (45) degrees.

The adapter of the present invention is utilized by circular-type saws powered by a.c. (alternating current) voltage or battery-powered portable circular-type saws. One particular circular-type saw with which the adapter of the present invention may be utilized is the Makita Cordless Circular Saw Model 5090D. Portable saws, such as the Makita Model 5090D, are typically utilized by utility technicians when working in the field or in areas where a.c. power is not available.

Figure 2A:
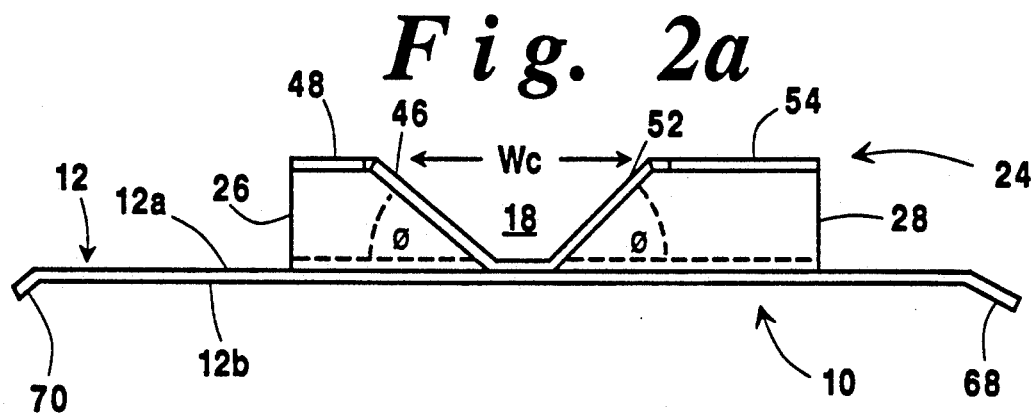
FIG. 2a is a side elevational view of an alternate embodiment of the corner portions of the adapter depicted in FIG. 2.
Figure 4:
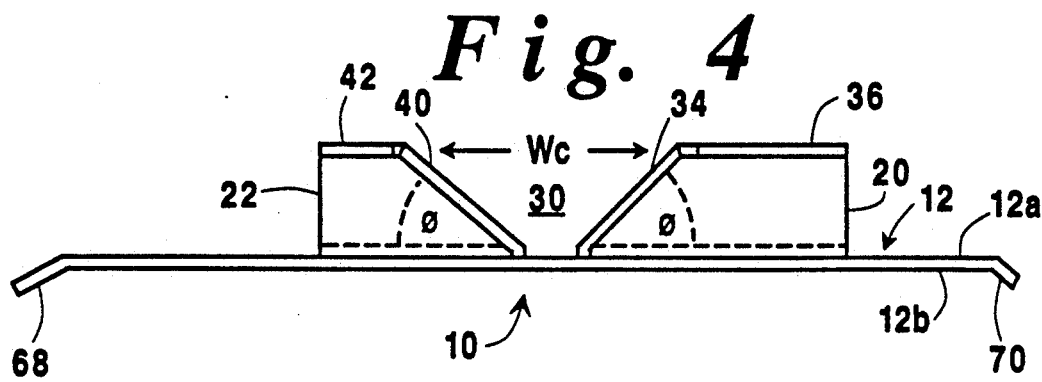
FIG. 4 is a side elevational view of the adapter taken along line 4—4 of FIG. 1.
Figure 4A:
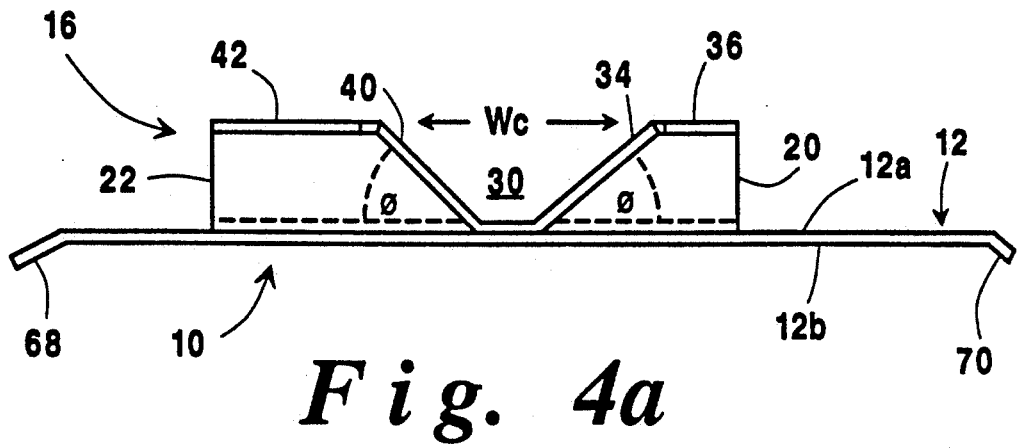
FIG. 4a is a side elevational view of an alternate embodiment of the corner portions of the adapter depicted in FIG. 4.

The adapter of the present invention has been described as having individual projecting corner portions 20, 22, 26 and 28 brazed or welded to base 12. However, FIGS. 2a and 4a show an alternate embodiment that utilizes monolithic sections 16 and 24 which are positioned adjacent lengthwise edges 56 and 58, respectively. Corner portions 20, 22 and 26, 28 are integral with sections 16 and 24, respectively.

Although the adapter of the present invention has been described as being fabricated from metal, the adapter can also be fabricated from rigid plastic.

Although the adapter of the present invention has been described in terms of making incisions in power, control or communication cables, the adapter can also be utilized to make longitudinal or circumferential incisions in circular ducts, pipes, conduits or p.v.c. (polyvinylchloride) tubing. Furthermore, the adapter can be readily removed if the user desires to cut flat stock.

Thus, the present invention meets the objects recited above and provides an easy to manufacture adapter in which the user attaches the adapter to the circular-type saw for making precision longitudinal and circumferential incisions in cables.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

While the invention has been illustrated and described in what are considered to be the most practical and preferred embodiments, it will be recognized that many variations are possible and come within the scope thereof, the appended claims therefore being entitled to a full range of equivalents.

Thus, having described the invention, what is claimed is:

1. An adapter for use with a circular-type saw for controllably making incisions in a tubular member, comprising:

a base having a top and bottom surface, said base having an elongated slot therein;

means for attaching said base to said saw in such a manner that said top surface of said base faces said saw, and said slot receives a portion of the blade of said saw, said blade portion being operative within said slot; and means for removably mounting said saw upon said tubular member in the area of said intended incision, said mounting means being attached to and projecting from said bottom surface of said base, said mounting means having first and second perpendicularly intersecting, substantially V-shaped channels, said second V-shaped channel substantially overlapping said slot, said blade portion being operative within said second V-shaped channel.

2. The adapter of claim 1 wherein the shape of said base is substantially rectangular, the ends of said base that are perpendicular to the axis of said saw being angulated, with respect to said base, in a direction opposite said tubular member so as to prevent said base from becoming lodged in rough, discontinuous portions of the outer surface of said tubular member.

* * * * *